United States Patent
Takeda et al.

(10) Patent No.: US 6,571,834 B2
(45) Date of Patent: Jun. 3, 2003

(54) GAS CHARGING DEVICE

(75) Inventors: Masaru Takeda, Amagasaki (JP); Teruo Hatori, Amagasaki (JP)

(73) Assignee: The BOC Group plc (GB)

(*) Notice: Subject to any disclaimer, the term of this patent is extended or adjusted under 35 U.S.C. 154(b) by 0 days.

(21) Appl. No.: 09/861,524

(22) Filed: May 22, 2001

(65) Prior Publication Data

US 2001/0045241 A1 Nov. 29, 2001

(30) Foreign Application Priority Data

May 23, 2000 (JP) ........................................ 2000-150791

(51) Int. Cl.[7] .............................................. B65B 31/00
(52) U.S. Cl. ......................... 141/18; 141/346; 141/349
(58) Field of Search ........................... 141/18, 348, 349, 141/350, 346, 347, 20

(56) References Cited

U.S. PATENT DOCUMENTS

| | | |
|---|---|---|
| 4,210,168 A | 7/1980 | Yonezawa |
| 4,341,245 A | 7/1982 | Daicho et al. |
| 5,063,976 A | 11/1991 | Oi et al. |
| 5,732,735 A | 3/1998 | Birch |
| 5,878,798 A * | 3/1999 | Harris et al. ................. 141/346 |

FOREIGN PATENT DOCUMENTS

JP      9-170672      6/1997

* cited by examiner

*Primary Examiner*—Gregory L. Huson
*Assistant Examiner*—Peter deVore
(74) *Attorney, Agent, or Firm*—Bacon & Thomas, PLLC

(57) ABSTRACT

A gas charging device reversely supplies fresh gas from a gas outlet (7b) of a pressure reducing valve (7) to a gas inlet (7a) thereof. A pressure reducing member (17) of the pressure reducing valve (7) has a communication passage (30) which places the gas outlet (7b) with an actuation chamber (29). The communication passage (30) has a peripheral wall (30a) provided in its end surface with a portion (43) to be sealed, which faces the gas outlet (7b). A charging nozzle (34) has an interior area provided with a charging passage (35) in communication with the gas outlet (7b). A push member (37) is attached to the charging nozzle (34) and is provided with a projection (40) which sticks out toward the pressure reducing member (17). The projection (40) has a sealing means (41). The sealing means (41) is directed from the gas outlet (7b) to the actuation chamber (28) so that it comes into sealing contact with the portion (43) to be sealed.

6 Claims, 3 Drawing Sheets

GAS CHARGING DEVICE

BACKGROUND OF THE INVENTION

1. Field of the Invention

The present invention relates to a gas charging device which reversely supplies fresh gas such as liquefied gas and compressed gas from a gas outlet of a pressure reducing valve to a gas inlet thereof.

2. Explanation of Related Art

The pressure reducing valve has its gas outlet communicated with an actuation chamber. When the gas outlet has its pressure increased, a pressure reducing member is moved in a closing direction by a closing force resulting from a pressure of the actuation chamber. This reduces gas to be taken out of the gas outlet of the pressure reducing valve. Therefore, in the event high pressure gas tries to reversely flow from the gas outlet of the pressure reducing valve into the gas inlet thereof, the high pressure gas within the gas outlet flows into the actuation chamber to move the pressure reducing member in the closing direction and then the pressure reducing valve closes. Thus in the case where high pressure fresh gas is supplied to a gas cylinder with the pressure reducing valve of this type, it was required, for example, to form a gas charging passage which bypasses the pressure reducing valve or to provide a gas charging port separate from a gas take-out port which communicates with the pressure reducing valve so that the fresh gas might not pass through the pressure reducing valve.

Japanese Patent Public Disclosure No. 9-170672 disclosed a conventional example of the pressure reducing valve through which fresh gas can be charged from a gas outlet into a gas cylinder, so as to solve the foregoing problem.

This pressure reducing valve comprises a housing including a pressure reducing valve chamber, an inlet passage which flows taken-out gas into the pressure reducing valve chamber, an outlet passage which discharges the taken-out gas from the pressure reducing valve chamber, and a pressure reducing member inserted into the pressure reducing valve chamber so as to control flow-out of the gas from the outlet passage. The pressure reducing member has a piston member which comprises a first piston near the pressure reducing member and a second piston radially larger and positioned further than the first piston. It also includes an urging means which urges the piston member in a valve-opening direction. Besides, an actuation chamber is formed on the further side of the second piston. The actuation chamber communicates with the outlet passage through a communication passage.

And the taken-out gas which flows in from the inlet passage moves the piston member in the valve-opening direction together with the urging means and flows from a gap between the pressure reducing member and an opposite pressure reducing valve seat out to the outlet passage to be reduced. A pressure of the taken-out gas at the outlet passage is transmitted to the actuation chamber through the communication passage. The pressure within the actuation chamber pushes the second piston to return the piston member in a valve-closing direction.

A movable means is arranged within the communication passage hermetically and slidably and is urged toward the outlet passage by a spring.

When charging high pressure fresh gas into a gas cylinder with this pressure reducing valve, a charging mouthpiece provided with a pushing portion at its leading end is attached to the outlet passage. The pushing portion inserted into the outlet passage pushes the movable means to move it toward the actuation chamber against the urging force of the spring. The movable means has an end which inhibits the fresh gas from flowing into the actuation chamber when brought into contact with a housing by the above movement. This prevents addition of a force onto the second piston in the valve-closing direction and thereby keeps the pressure reducing valve open. Then the high pressure fresh gas flows into the gas cylinder through the pressure reducing valve.

The conventional technique is excellent in that it can effect the fresh gas charging through the pressure reducing valve and need not provide a charging passage or the like which bypasses the pressure reducing valve, but it has the following problems:

(1) In order to inhibit the flow-in of the fresh gas from the gas outlet to the actuation chamber when charging, a movable means has to be provided hermetically and slidably within the communication passage. This complicates the structure of the pressure reducing valve.

It is considered to construct the movable means by part of the piston member in order to solve that problem. However, the movable means moves in the valve-opening direction so as to prevent the gas from flowing into the actuation chamber. On the other hand, the piston member is urged in the valve-opening direction through the urging means. Consequently, in the event the movable means is constructed by the part of the piston member, when taking the gas out of the gas cylinder, the piston member has already moved toward the valve opening side and therefore the taken-out gas does not flow into the actuation chamber, which entails a problem of being unable to reduce its pressure.

(2) The pushing portion provided at the leading end of the charging mouthpiece is inserted into the outlet passage so as to push the movable means within the communication passage when charging the fresh gas. The movable means must be firmly pushed for inhibiting the flow of the fresh gas from the outlet passage into the actuation chamber and therefore the pushing portion needs a predetermined size. Further, the outlet passage into which the pushing portion is inserted must have its sectional area increased more than that of the pushing portion so as to be able to secure a gas charging passage between the inserted pushing portion and itself. This results in increasing a sealing area of the pressure reducing member which seals this outlet passage. And the first piston has its sectional area increased more than the sealing area of the pressure reducing member so that it can move in the valve-opening direction with the pressure of the gas which flows into the pressure reducing valve chamber when taking out the gas. In addition, the second piston is radially larger than the first piston. As a result, there is caused a problem that the pressure reducing valve become quite large in correspondence with the size of the pushing portion.

SUMMARY OF THE INVENTION

The present invention has an object to seal the flow-in of fresh gas from the gas outlet to the actuation chamber by a sealing means which is small and has a simple structure and to make compact a pressure reducing valve to which the present gas charging device is applied.

In order to accomplish the above-mentioned object, the present invention has constructed a gas charging device in the following manner, for example, as shown in FIGS. 1 to 3.

The gas charging device is provided with a charging nozzle 34 which has a nozzle leading end portion 45. There is provided within the charging nozzle 34 a charging passage in communication with the gas outlet 7b. Attached to the charging nozzle 34 is a push member 37. The push member 37 is provided with a projection 40, which sticks out toward the pressure reducing member 17 ahead of the nozzle leading end portion 45. The projection 40 is provided with a sealing means 41, which is directed from the gas outlet 7b to the actuation chamber 29 so that it comes into sealing contact with the portion 43 to be sealed. This contact inhibits the fresh gas supplied to the gas outlet 7b from flowing to the actuation chamber 29.

The gas charging device is provided with a charging nozzle 34 which has a nozzle leading end portion 45. There is provided within the charging nozzle 34 a charging passage 35 which communicates with the gas outlet 7b. Attached to the charging nozzle 34 is a push member 37. The push member 37 is provided with a projection 40, which sticks out toward the pressure reducing member 17 ahead of the nozzle leading end portion 45. The projection 40 is provided with a sealing means 41, which is directed from the gas outlet 7b to the actuation chamber 29 so that it comes into sealing contact with the portion 43 to be sealed. This contact inhibits the fresh gas supplied to the gas outlet 7b from flowing to the actuation chamber 29.

The present invention functions as follows.

When taking out gas, if the taken-out gas flows from the gas inlet into the pressure reducing valve chamber, a pressure of the gas separates the pressure reducing member from the pressure reducing valve seat. This allows the taken-out gas to flow from a gap between the pressure reducing member and the pressure reducing valve seat out to the outlet passage while it is being reduced. The pressure of the taken-out gas which has flowed out to the outlet passage is transmitted to the actuation chamber through the communication passage. The pressure within the actuation chamber pushes the pressure reducing member to return it toward the pressure reducing valve seat. The pressure reducing member moves close to and away from the pressure reducing valve seat by a closing force resulting from the gas pressure within the actuation chamber and an opening force attributable to the gas pressure of the gas inlet. This reduces the pressure of the taken-out gas which flows out of the gas outlet.

On the other hand, when supplying fresh gas from the gas outlet of the pressure reducing valve to the gas inlet thereof, a charging mouthpiece is attached to the outlet passage. And the sealing means provided in the projection is directed from the gas outlet to the actuation chamber so that it comes into contact with the portion to be sealed, which is provided in the end surface of the peripheral wall of the communication passage. This seals the communication passage as it is covered with the sealing means and inhibits the flow of the fresh gas from the gas outlet into the actuation chamber. As a result, the pressure reducing member is pushed by the fresh gas pressure within the gas outlet to move toward the valve-opening side and the fresh gas is supplied to the gas inlet of the pressure reducing valve chamber.

The present invention is constructed and functions as mentioned above. Therefore, it has the following advantages.

(1) Being provided in the end surface of its peripheral wall with a portion to be sealed so that the portion to be sealed faces the gas outlet, the communication passage can be sealed only by directing the sealing means of the charging mouthpiece from the gas outlet to the actuation chamber so that it comes into contact with the portion to be sealed. This can supply the fresh gas from the gas outlet of the pressure reducing valve to the gas inlet thereof without closing the pressure reducing member. In consequence, there is no need of providing the movable member required by the conventional technique to result in the possibility of simplifying the structure of the pressure reducing valve and besides removing the space for accommodating the movable member to make the pressure reducing valve compact.

(2) Further, the portion to be sealed, which is provided in the end surface of the peripheral wall of the communication passage, faces the gas outlet. The communication passage can be sealed as it is covered with the sealing means only by directing the sealing means from the gas outlet to the actuation chamber so that it comes into sealing contact with the portion to be sealed. Therefore, the sealing means to be provided in the projection can be readily downsized, which results in the possibility of reducing the diameter of the communication passage to form the pressure reducing member into a small structure. In consequence, the pressure reducing valve can be made compact as a whole.

The push member can be supported by the charging nozzle so as to advance and retreat with respect to the pressure reducing member and be urged toward the pressure reducing member by an urging means. In this case, since the urging means pushes the push member, the sealing means can be firmly pushed to the portion to be sealed, which results in the possibility of assuredly sealing the communication passage. As for the urging means, it is possible to employ a spring or the like resilient member. Alternatively, it is possible to use pressure of gas such as fresh gas or to employ a combination of these ones.

A gas discharge port which communicates the charging passage within the charging nozzle with the gas outlet may be provided in the nozzle leading end portion. In this case, the projection of the push member can be formed in the shape of a rod. In the event the projection is formed cylindrical, the gas discharge port may be provided in the cylindrical wall to communicate the charging passage with the gas outlet through an interior area of the cylindrical projection and the gas discharge port.

DESCRIPTION OF THE PREFERRED EMBODIMENTS

Hereafter, explanation is given for embodiments of the present invention based on the drawings.

Figure 1:
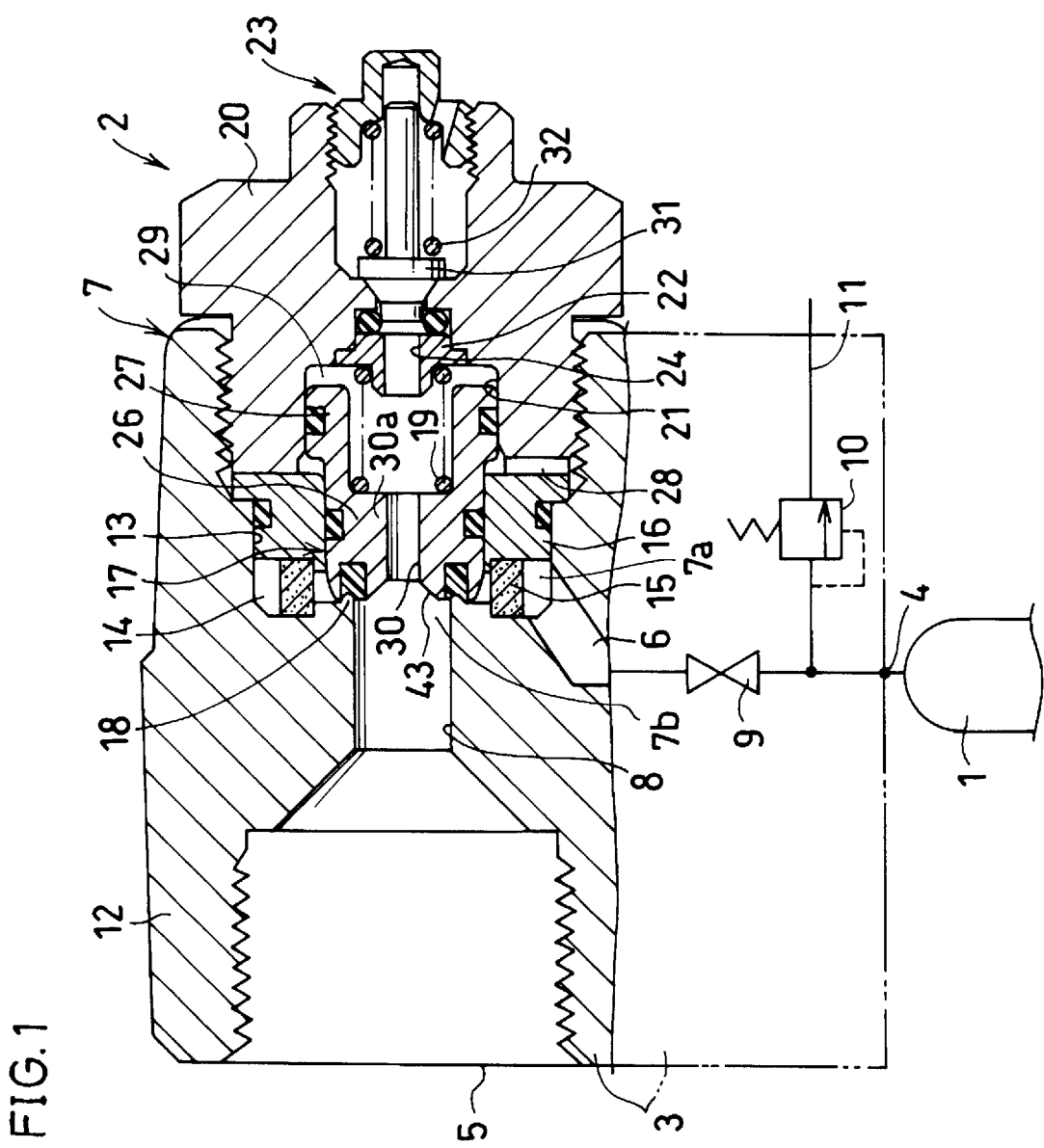
FIG. 1 shows a first embodiment of the present invention and is a sectional view of a pressure reducing valve provided in a valve assembly.

As shown in FIG. 1, a valve assembly 2 fixed to a gas cylinder 1 comprises a housing 3 having an outer surface provided with an inlet bore 4 and an outlet bore 5. A pressure reducing valve 7 is arranged between the inlet bore 4 and the outlet bore 5. The pressure reducing valve 7 has a gas inlet 7a communicated with the inlet bore 4 through an inlet passage 6 and has a gas outlet 7b communicated with the outlet bore 5 through an outlet passage 8.

The inlet passage 6 has a shut off valve 9 provided between the inlet bore 4 and the gas inlet 7a. An interpassage between the shut off valve 9 and the inlet bore 4 communicates with a gas blow-out hole 11 of an upstream safety valve 10.

The outlet bore 5 is provided in an end surface of an outlet nozzle 12 formed on one side of the housing 3. A gas take-out mouthpiece (not shown) is connectable to the outlet nozzle 12.

A bore 13 for attaching the pressure reducing valve 7 is formed in a side surface opposite to the outlet nozzle 12 of the housing 3. The attaching bore 13 has an interior area formed with a pressure reducing valve chamber 14 and has an inner wall provided with the gas outlet 7b.

The attaching bore 13 has a cylindrical filter 15 and a tubular member 16 attached thereto in the mentioned order from its inner portion. A pressure reducing member 17 is inserted inwards of the tubular member 16. A pressure reducing valve seat 18 is formed on a peripheral edge of an opening of the gas outlet 7b. The pressure reducing member 17 is arranged so as to be able to advance and retreat with respect to the pressure reducing valve seat 18 and is resiliently pushed toward the pressure reducing valve seat 18 through a spring 19 of a resilient means.

The attaching bore 13 is closed by a bolt-like cap member 20, which fixes the cylindrical filter 15 and the tubular member 16. The cap member 20 has an inner surface formed with a recess 21. A spring retainer 22 is arranged within this recess 21 to support the spring 19. The spring retainer 22 has a mid portion formed with a communication hole 24 which communicates with a downstream safety valve 23 provided in an outer surface of the cap member 20.

The pressure reducing member 17 is provided with a first piston 26 near the gas inlet 1a and a second piston 27 radially larger and positioned further than the first piston 26. The first piston 26 hermetically slides on an inner surface of the tubular member 16. The second piston 27 hermetically slides on an inner surface of the recess 21 of the cap member 20. Numeral 28 indicates an atmosphere communication hole in communication with an outer surface of the pressure reducing member 17 between the first piston 26 and the second piston 27, with an exterior area of the housing 3.

An actuation chamber 29 is formed on the further side where the second piston 27 is positioned, between the cap member 20 and the second piston 27. Further, a communication passage 30 extends through the pressure reducing member 17. The actuation chamber 29 communicates with the gas outlet 7b through the communication passage 30.

Next, explanation is given for a case where gas is taken out of the gas cylinder 1 through the pressure reducing valve 7.

When the shut off valve 9 is opened, gas within the gas cylinder 1 flows from the gas inlet 7a into the pressure reducing valve chamber 14 via the inlet passage 6. The gas passes through a cylindrical wall of the cylindrical filter 15 to be filtered. At this time, the filter 15 is formed of cylindrical share to result in an increased filtration area. A fine filter can be adopted. Besides, it is arranged near the pressure reducing member 17 and the pressure reducing valve seat 18. This can effectively remove fine foreign matters from the taken-out gas which flows into the pressure reducing valve chamber 14 and as a result can prevent these foreign matters from attaching to a valve face of the pressure reducing member 17 and the pressure reducing valve seat 18. Thus it is possible to retain the pressure reducing efficiency high over a prolonged period of time.

If the taken-out gas which has flowed in from the gas inlet 7a has a pressure higher than a predetermined residual pressure valve, it pushes the first piston 26 against a pushing force of the spring 19 to separate the pressure reducing member 17 from the pressure reducing valve seat 18. This opens the pressure reducing valve 7, thereby allowing the taken-out gas to flow from a gap between the pressure reducing member 17 and the pressure reducing valve seat 18 out to the outlet passage 8 through the gas outlet 7b while it id being reduced. The pressure of the taken-out gas at the gas outlet 7b is transmitted to the actuation chamber 29 through the communication passage 30. The pressure within the actuation chamber 29 pushes the second piston 27 to return the pressure reducing member 17 toward the pressure reducing valve seat 18. This reduces the pressure of the taken-out gas which flows out of the gas outlet 76b by a balance between a taken-out gas pressure added to the first piston 26, and a force resultant from a gas pressure of the actuation chamber 29 added to the second piston 27 and the resilient force of the spring 19, and let it go out of the outlet bore 5.

In the event that the pressure within the gas outlet 7b abnormally increases to become higher than a set pressure of the downstream safety valve 23, the gas which has flowed into the actuation chamber 29 pushes a safety member 31 of the downstream safety valve 23 through the communication hole 24 and opens the downstream safety valve 23 against a pushing force of a safety spring 32. This discharges part of the gas having its pressure abnormally increased to an exterior area, thereby lowering the pressure within the gas outlet 7b and the outlet passage 8 to not more than the safe set pressure.

When the gas is continuously consumed to remain in a little amount within the gas cylinder 1 and as a result the taken-out gas which flows from the inlet passage 6 into the pressure reducing valve chamber 14 has a pressure lower than the predetermined residual pressure value, the gas pressure which pushes the first piston 26 becomes weaker than the pushing force of the spring 19. This pushes the pressure reducing member 17 to the pressure reducing valve seat 18 to thereby close the pressure reducing valve 7 and stop taking out the gas with a predetermined residual pressure retained in the gas cylinder 1.

Next, explanation is given for a gas charging device which discharges liquefied gas or compressed gas into the gas cylinder 1.

Figure 2:
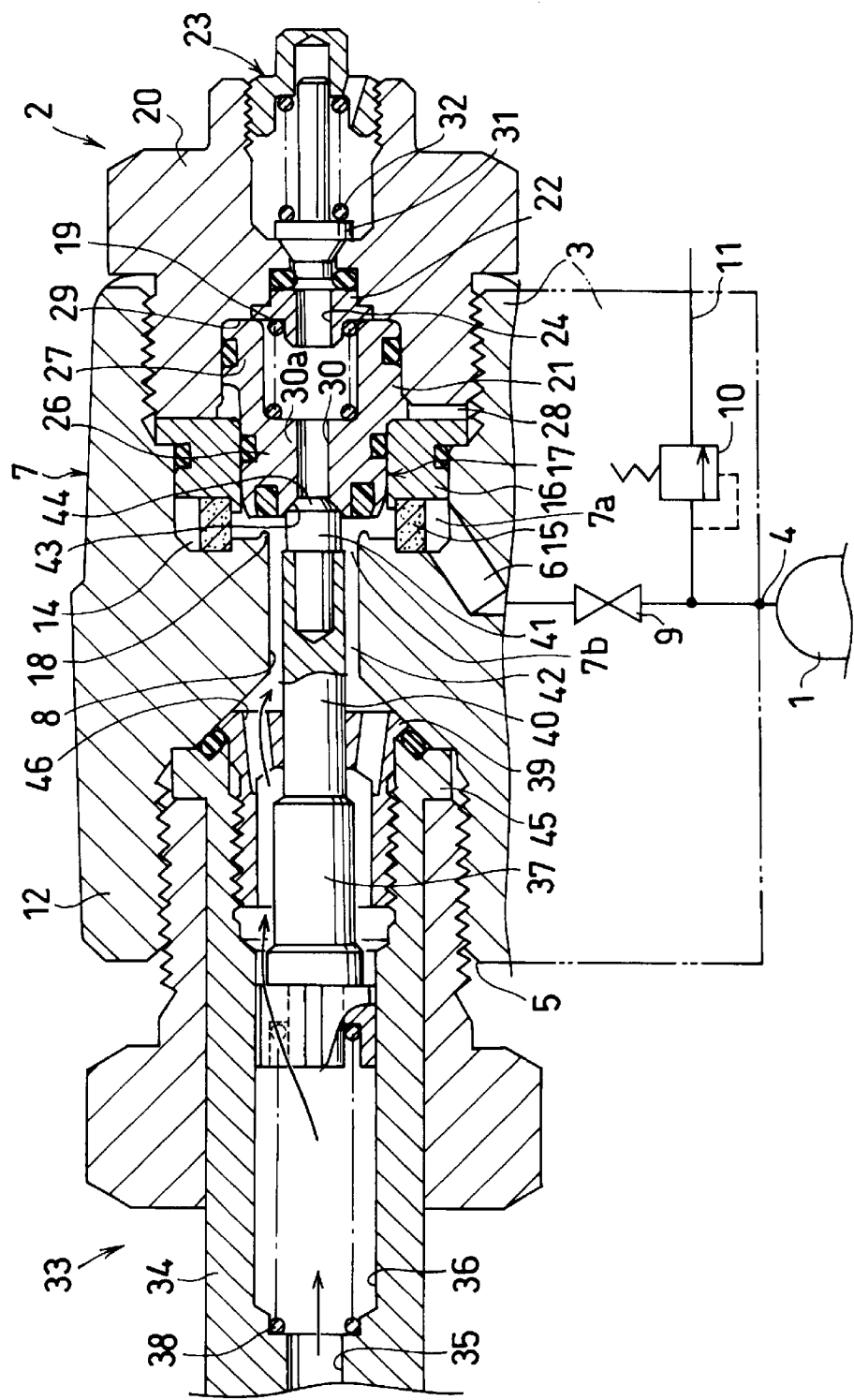
FIG. 2 is a sectional view of a gas charging device and shows the pressure reducing valve with a charging mouthpiece attached thereto.

As shown in FIG. 2, a charging mouthpiece 33 of the gas charging device is attached to the outlet nozzle 12 of the housing 3. More specifically, the charging mouthpiece 33 has a charging nozzle 34 attached into the outlet nozzle 12 in screw-thread engagement and hermetically connected thereto. A charging passage 35 is formed within the charging nozzle 34. The above connection places this charging passage 35 in communication with the gas outlet 7b through the outlet passage 8.

The charging nozzle 34 has a leading end portion formed to provide an attaching bore 36. A rod-like push member 37 is attached to this bore 36 so as to be able to advance and retreat. This push member 37 is resiliently pushed to a leading end side (right side in FIG. 2) by an urging spring 38. An intermediate portion of the push member 37 is supported by a sleeve 39 attached to a nozzle leading end portion 45 of the charging nozzle 34 in screw-thread engagement. The push member 37 is provided with a projection 40. The projection 40 sticks out of the nozzle leading end portion 45 toward the pressure reducing member 17. The projection 40 has a leading end fixedly provided with a sealing means 41 which is formed from a resilient member. The sealing means 41 has at its leading end a shoulder portion formed with a sealing portion 44.

When the charging mouthpiece 33 is attached to the outlet nozzle 12, the projection 40 is inserted into the outlet passage 8. The projection 40 has a diameter smaller than an inner diameter of the outlet passage 8 and therefore a flow passage 42 of the fresh gas is formed around the projection 40 within the outlet passage 8. The sleeve 39 is provided with a gas discharge port 46 on the nozzle leading end side. The charging passage 35 communicates with the gas outlet 7b through the gas discharge port 46 and the flow passage 42.

The communication passage 30 which extends through the pressure reducing member 17 of the pressure reducing valve 7 is formed substantially in alignment with the outlet passage 8. The communication passage 30 has a peripheral wall 30a formed in an end surface of its gas outlet 7b side with a portion 43 to be sealed, which comprises an outwardly flaring conical surface smaller than a section of the outlet passage 8 and faces the gas outlet 7b.

The attachment of the charging mouthpiece 33 directs the sealing portion 44 of the sealing means 41 fixedly provided at the leading end of the projection 40 from the gas outlet 7b to the actuation chamber 29 so that it comes into contact with the portion 43 to be sealed to thereby seal the communication passage 30. At the same time, it pushes the pressure reducing member 17 in a right direction on the drawing with the pushing force of the urging spring 38 to thereby open the pressure reducing valve 7.

In this state, when the shut off valve 9 is opened and the fresh gas is flowed in from the charging passage 35 of the charging mouthpiece 33, the fresh gas flows from the gas outlet 7b into the pressure reducing valve chamber 14 through the flow passage 42 within the outlet passage 8. At this time, since the push member 37 receives the pressure of the fresh gas in addition to the pushing force of the urging spring 38, the sealing portion 44 of the sealing means 41 is firmly pushed to the portion 43 to be sealed, thereby sealing the communication passage 30 with assuredness.

The fresh gas which has flowed into the pressure reducing valve chamber 14 adds a pressure to the first piston 26 in a valve-opening direction. At this time, the fresh gas does not flow into the actuation chamber 29 because the communication passage 30 is sealed by the sealing means 41. This does not add to the second piston 27 such a gas pressure as pushing it to return in a valve-closing direction and therefore keeps the pressure reducing valve 7 open. As a result, the fresh gas flows from the charging passage 35 into the gas cylinder 1 through the gas discharge port 46, the flow passage 42 within the outlet passage 8, the gas outlet 7b, the pressure reducing chamber 14, the gas inlet 7a, the inlet passage 6 and the shut off valve 9 in the mentioned order and is charged into the gas cylinder 1.

Although the gas outlet 7b has its inner pressure increased to become high by the fresh gas, the communication passage 30 is sealed and therefore the fresh gas does not flow into the actuation chamber 29, which prevents the downstream safety valve 23 from opening by the high pressure of the fresh gas.

In the first embodiment, the portion 43 to be sealed is constructed by the outwardly flaring conical surface formed in the end surface on the side of the gas outlet 7b of the pressure reducing member 17. The portion 43 to be sealed may be formed from an annular convex portion made on a peripheral edge of the opening of the communication passage or may be formed in an interior area of the pressure reducing member 17.

Figure 3:
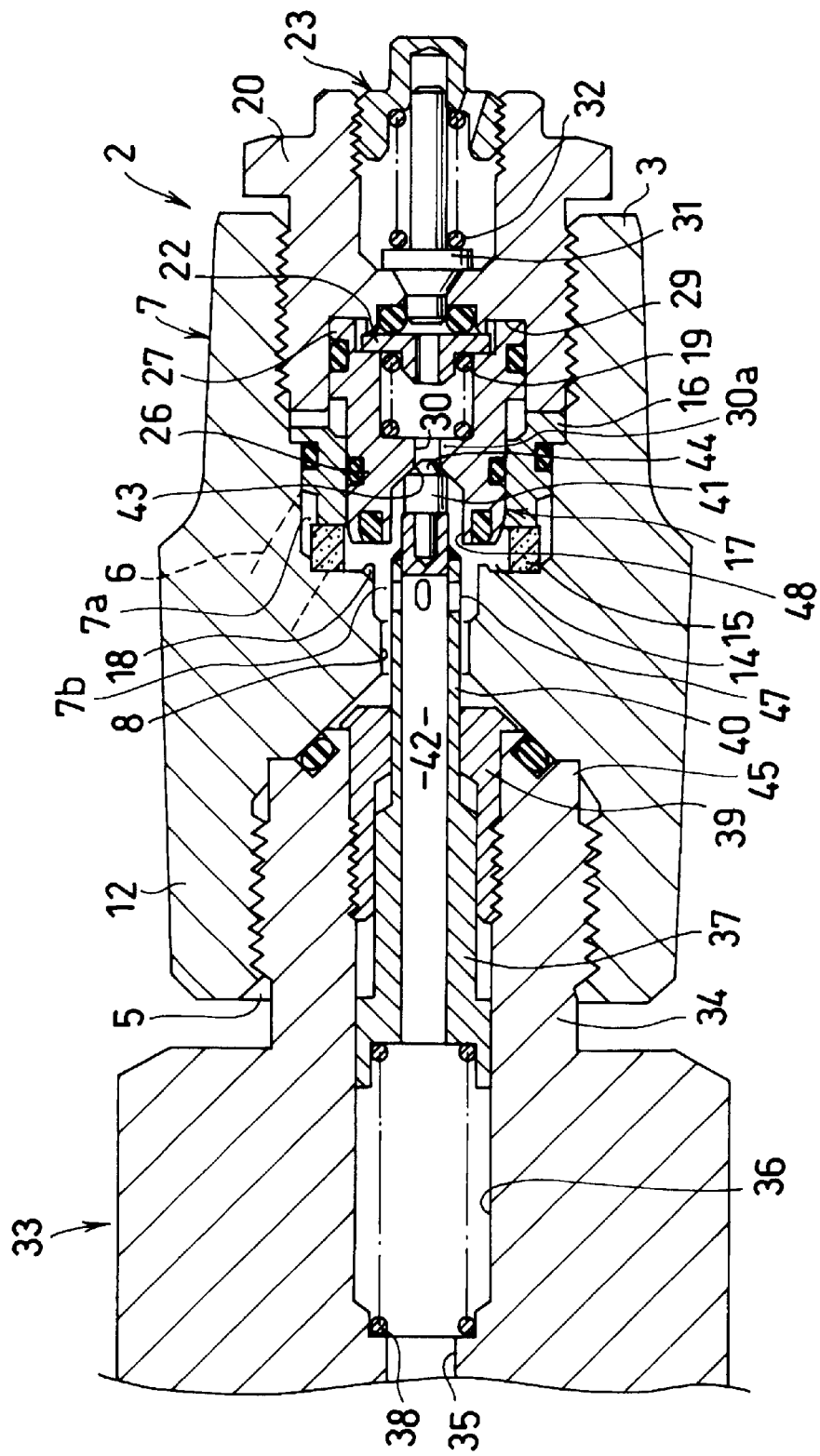
FIG. 3 shows a second embodiment of the present invention and is a view similar to FIG. 2.

For instance, a second embodiment shown in FIG. 3 provides a recess 48 slightly larger than the sealing means 41 in diameter, in the end surface of the gas outlet 7b side of the pressure reducing member 17. The recess 48 has an inner portion formed with the communication passage 30 which communicates the gas outlet 7b with the actuation chamber 29. This communication passage 30 has a peripheral wall 30a formed in its end surface with a conical surface flaring toward the gas outlet 7b. This conical surface constitutes the portion 43 to be sealed. And in a state where the charging mouthpiece 33 is attached to the outlet nozzle 12, the projection 40 of the push member 37 supported by the charging nozzle 34 is inserted into the outlet passage 8 and the sealing means 41 disposed at the leading end of the projection 40 is inserted into the recess 48 to bring the sealing portion 44 formed on the shoulder portion at the leading end of the sealing means 41 into contact with the portion 43 to be sealed. This seals the communication passage 30.

In this second embodiment, the projection 40 is formed cylindrical. This projection 40 has an interior area provided with the flow passage 42 of the fresh gas and has a cylindrical wall formed with a gas discharge port 47. The charging passage 35 within the charging nozzle 34 communicates with the gas outlet 7b through the flow passage 42 and the gas discharge port 47.

The other constructions are the same as those of the first embodiment. Accordingly, explanation therefor is omitted.

What is claimed is:

1. A gas charging device for charging a gas cylinder with fresh gas, the gas cylinder having a valve assembly including an outlet nozzle and a pressure reducing valve communicating with the outlet nozzle, the pressure reducing valve including a gas inlet, a gas outlet, a valve seat, an actuation chamber, a pressure reducing valve member arranged to be in communication with the gas inlet so as to be urged away from the valve seat due to gas pressure in the gas inlet and urged towards the valve seat due to a predetermined gas pressure in the actuation chamber, and a communication passage extending through the pressure reducing valve and in communication with the actuation chamber and the gas outlet, the communication passage having a sealing surface defined at an end thereof facing the gas outlet;

the gas charging device comprising:
a charging nozzle configured and dimensioned to engage with the outlet nozzle, said charging nozzle having a leading end portion;
a charging passage defined within the charging nozzle and arranged to communicate with the gas outlet when the charging nozzle is engaged with the outlet nozzle;
a push member connected to the charging nozzle and having a projection extending outwardly from the charging nozzle; and
a sealing means provided on the projection, said sealing means configured and dimensioned to sealingly engage with the sealing surface of the communication passage, thereby inhibiting gas flow through the communication passage and opening the pressure reducing valve to permit gas flow from the gas outlet through the gas inlet and into the gas cylinder.

2. The gas charging device as set forth in claim 1, wherein the push member (37) is supported by the charging nozzle (34) so that it advances and retreats with respect to the pressure reducing member (17) and is urged toward the pressure reducing member (17) by an urging means (38).

3. The gas charging device as set forth in claim 2, wherein the charging nozzle (34) has the nozzle leading end portion (45) provided with a gas discharge port (46) which communicates the charging passage (35) within the charging nozzle (34), with the gas outlet (7*b*).

4. The gas charging device as set forth in claim 2, wherein the projection (40) of the push member (37) is formed cylindrical and has a cylindrical wall provided with a gas discharge port (47) which communicates the charging passage (35) within the charging nozzle (34), with the gas outlet (7*b*).

5. The gas charging device as set forth in claim 1, wherein the charging nozzle (34) has the nozzle leading end portion (45) provided with a gas discharge port (46) which communicates the charging passage (35) within the charging nozzle (34), with the gas outlet (7*b*).

6. The gas charging device as set forth in claim 1, wherein the projection (40) of the push member (37) is formed cylindrical and has a cylindrical wall provided with a gas discharge port (47) which communicates the charging passage (35) within the charging nozzle (34), with the gas outlet (7*b*).

* * * * *